Oct. 19, 1937.   E. E. HEWITT   2,096,494
FLUID PRESSURE BRAKE
Filed Feb. 12, 1937   3 Sheets-Sheet 1

INVENTOR
ELLIS E. HEWITT
BY Wm. M. Cady
ATTORNEY

Oct. 19, 1937.  E. E. HEWITT  2,096,494
FLUID PRESSURE BRAKE
Filed Feb. 12, 1937   3 Sheets-Sheet 2

INVENTOR
ELLIS E. HEWITT
BY Wm. M. Cady
ATTORNEY

Oct. 19, 1937.  E. E. HEWITT  2,096,494
FLUID PRESSURE BRAKE
Filed Feb. 12, 1937  3 Sheets-Sheet 3
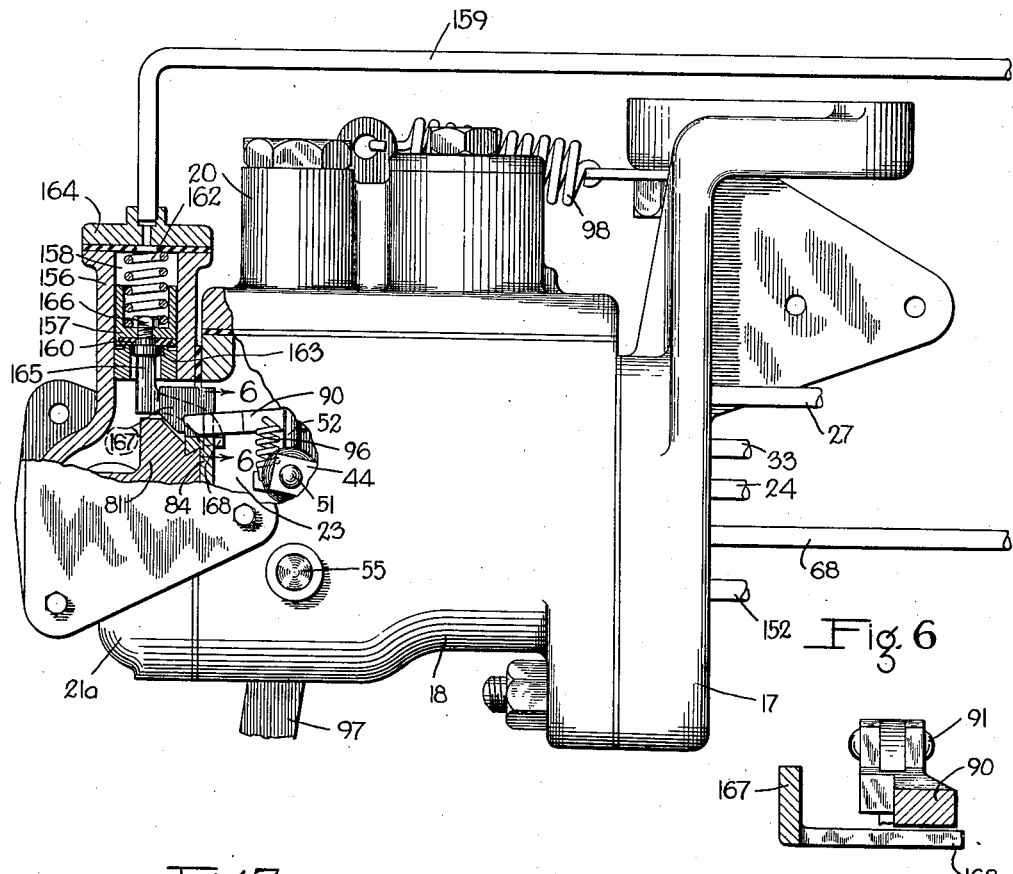
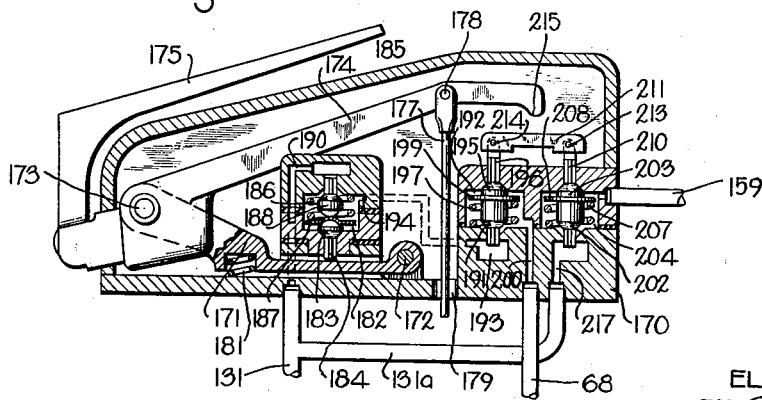
INVENTOR
ELLIS E. HEWITT
BY *Wm. M. Bady*
ATTORNEY Patented Oct. 19, 1937

2,096,494

UNITED STATES PATENT OFFICE 2,096,494

FLUID PRESSURE BRAKE

Ellis E. Hewitt, Edgewood, Pa., assignor to The Westinghouse Air Brake Company, Wilmerding, Pa., a corporation of Pennsylvania Application February 12, 1937, Serial No. 125,385

10 Claims. (Cl. 303—19)

This invention relates to fluid pressure brake systems, and particularly to control apparatus for controlling fluid pressure brake equipments of the type employed on safety cars and motor buses.

One well known type of safety car equipment comprises a fluid pressure brake controlled by a self-lapping brake valve device which is operable through the medium of a pedal to effect service applications of the brakes at various degrees of pressure and is automatically operative when the operator's foot is removed from the pedal to effect a so-called dead man's emergency application of the brakes, unless a predetermined service application has previously been made, in which case mechanism included in the brake valve device is adapted to suppress the dead man's emergency application of the brakes to permit removal of the operator's foot from the pedal. It is desirable, however, that means be provided for enabling the operator to effect an emergency application of the brakes at any time by moving the brake valve device to an emergency position.

The principal object of my invention is to provide improved means whereby the brake valve device may be operated to effect an emergency application of the brakes when the pedal is moved beyond service position into an emergency position.

Another object of the invention is to provide means which is designed for association with a self-lapping brake valve device of the type embodying mechanism for suppressing dead man's emergency operation thereof following a service application of the brakes, and which means is operative when the brake pedal is moved to an emergency position to render said mechanism ineffective to suppress an emergency application of the brakes.

Other objects and advantages of the invention will be apparent in the following more detailed description thereof, taken with reference to the accompanying drawings, wherein;

Fig. 5 is an elevational view, partly in section, of a self-lapping brake valve device embodying another form of my invention;

Fig. 6 is a view taken on the line 6—6 of Fig. 5; and

Fig. 7 is a sectional view of the brake pedal device adapted for association with the brake valve device shown in Fig. 5.

Figure 1:
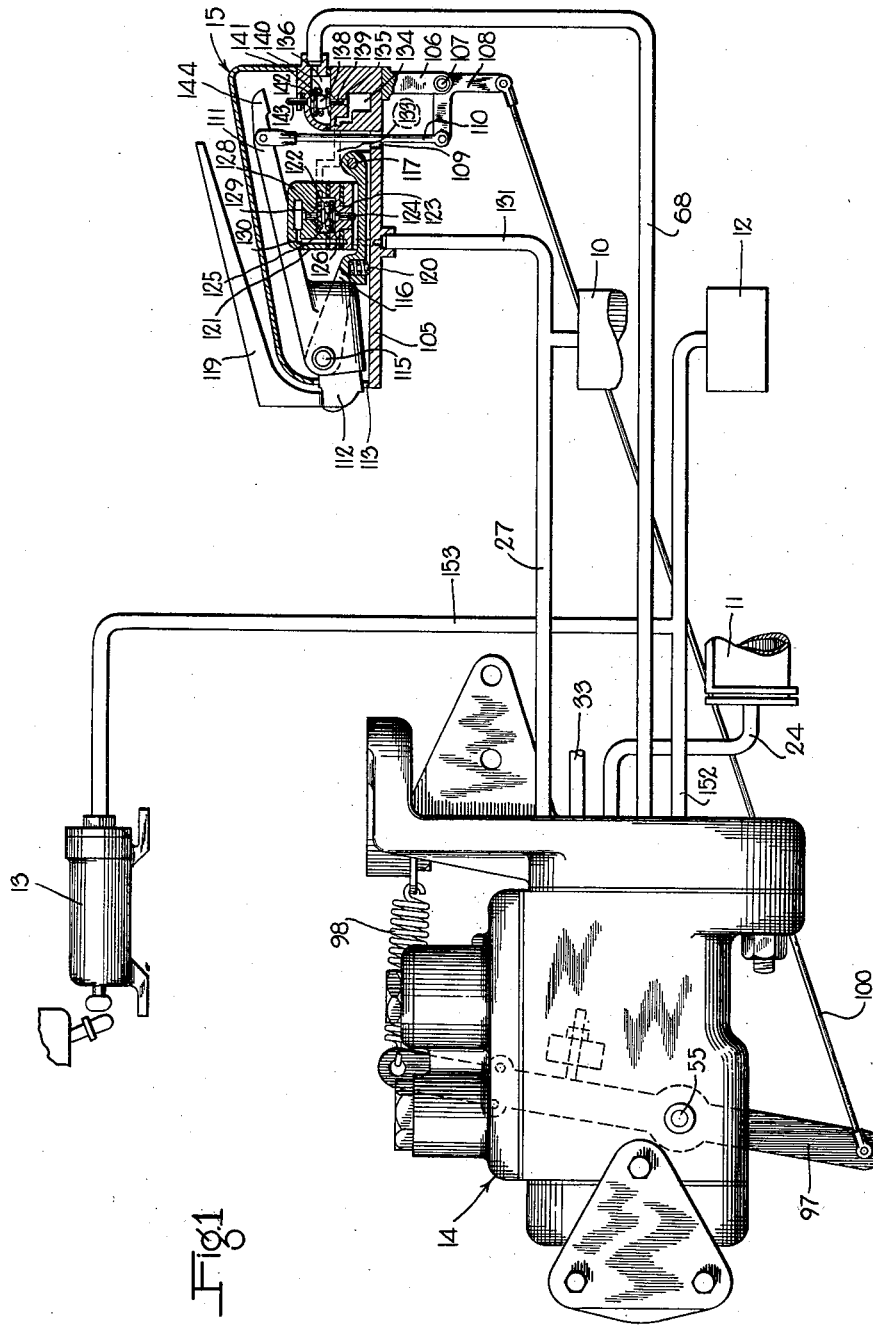
Fig. 1 is a diagrammatic view, partly in section, of a safety car brake control equipment embodying the invention.

Referring to Fig. 1 of the drawings, the apparatus includes a main reservoir 10, a brake cylinder 11, a sanding device 12, a circuit breaker device 13, a self-lapping brake valve device 14, and a foot operated brake pedal device 15.

The brake valve device 14 is of the self-lapping type and is similar in construction and operation to that shown and described in the application of David W. Lloyd, Serial No. 698,243, filed November 16, 1933.

Figure 2:
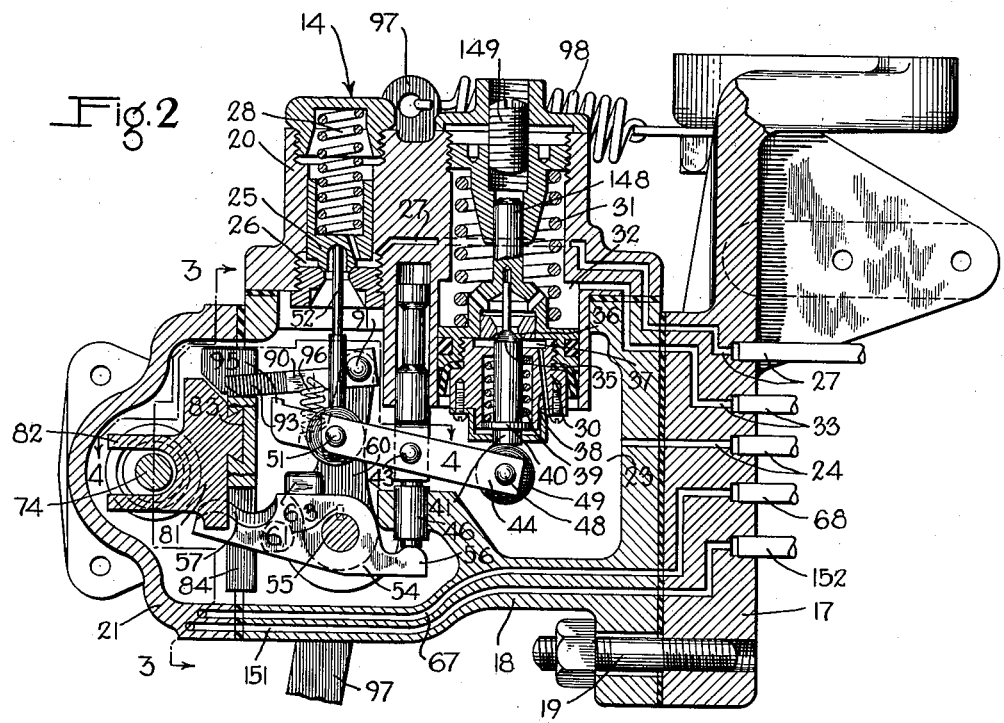
Fig. 2 is an enlarged detail sectional view of the self-lapping brake valve device shown in Fig. 1.

As is best shown in Fig. 2 of the drawings, the brake valve device 14 comprises a pipe bracket 17 to which is secured by bolts 19, a main section 18 of a casing. A valve section 20 and an emergency piston section 21, are secured to the main section 18 in a suitable manner. The casing sections 18, 20 and 21 define a pressure chamber 23 which is connected through a passage and pipe 24 with the brake cylinder 11, shown in Fig. 1.

A supply valve 25 is slidably mounted in a suitable bore formed in the valve section 20 for controlling communication between the pressure chamber 23 and a valve chamber 26 which is connected by way of a passage and pipe 27 with the main reservoir 10. A spring 28 is provided for normally maintaining the supply valve 25 in its seated position as shown in Fig. 2 of the drawings.

Slidably mounted in another bore formed in the casing section 20 parallel to that containing the supply valve 25 is a metering piston 30, which is subject to the opposing forces of fluid in the pressure chamber 23 and of a metering spring 31 that is disposed in a chamber 32 communicating with the atmosphere by way of a passage and pipe 33. A release valve 35 is operatively mounted in the piston 30 and is adapted to engage a valve seat 36 carried within the piston for controlling communication between the chamber 32 and a valve chamber 37 which is open to the pressure chamber 23 by way of a passage 38. The release valve 35 is normally urged away from the seat 36 by the pressure of a light spring 39 which is interposed between the piston 30 and a flange 40 formed on a stem 41 of the valve 35 extending into the pressure chamber 23.

For controlling the operation of the supply and release valves 25 and 35, there is provided mechanism comprising spaced levers 44 and 45, which are pivotally connected, intermediate their ends, to a pin 43 which is carried on a plunger 46 that is slidably guided within suitable bores formed in the casing section 18 as shown in Fig. 2. At one side of the pivot pin 43 the ends of the levers 44 and 45 are connected together by means of a pin 48 on which is mounted a roller 49 that is adapted to engage the end of the stem 41 of the release valve 35. At the other side of the pivot pin 43, the ends of the levers are connected together by means of a pin 51 which is pivotally connected to one end of a rod 52, the opposite end of which operatively engages the supply valve 25.

For controlling movement of the plunger 46 there is provided a rocking lever 54, which is journaled on a shaft 55 having the ends thereof rotatably mounted in the casing section 18. The rocking lever 54 is provided with an arm 56 adapted to engage the end of the plunger 46, and has formed on the opposite end thereof a cam face 57, the purpose of which will hereinafter appear.

A lever 60 is carried on the shaft 55 and is keyed thereto by means of a key 61. The lever 60 is provided with a lug 63 which is adapted to engage an upper surface of the rocking lever 54 for causing said lever to turn with the shaft 55 when the lever 60 is moved in a counterclockwise direction, as viewed in Fig. 2 of the drawings. It will be noted however that the rocking lever 54 is thus adapted to turn in a counterclockwise direction independently of the lever 60 when downward pressure is applied to the cam face 57.

Figure 3:
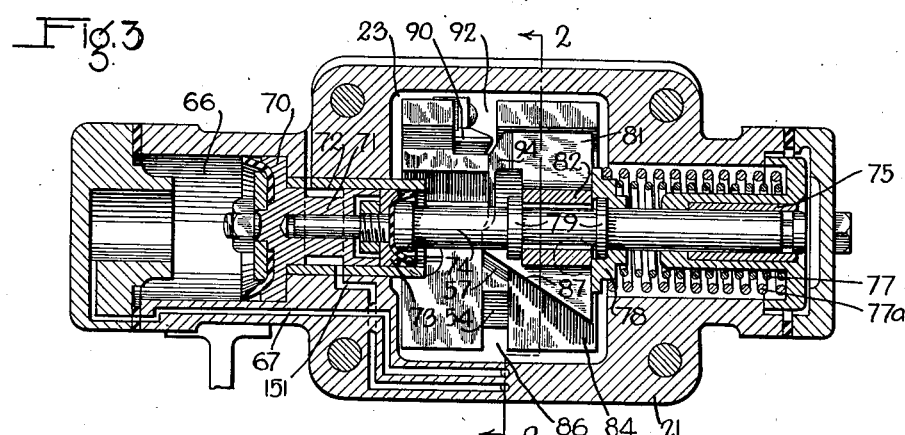
Fig. 3 is a sectional view taken on the line 3—3 of Fig. 2.

As is best shown in Fig. 3 of the drawings, the emergency piston section 21 has formed therein a piston chamber 66, which communicates by way of a passage 67 with a pipe 68. Operatively mounted in the chamber 66 is an emergency piston 70, having a stem 71 extending into a bore 72 which opens into the pressure chamber 23. The right-hand end of the stem 71 is adapted to engage a piston 73 which is slidably mounted in the bore 72 and has a stem 74 having one end slidably mounted in a guide bushing 75 carried within the casing section 21. A pair of springs 77 and 77a is disposed around the bushing 75 and act against a collar member 78 which engages one of a pair of flanges 79 formed on the stem 74 for urging said stem and the pistons 73 and 70 toward the left-hand or emergency position.

The stem 74 is adapted to control movement of a cam member 81, which is provided within the casing section 21 and has a projecting yoke portion 82 interposed between the flanges 79 on the stem. The cam member 81 has a horizontally disposed tongue 83 formed on the opposite side thereof and slidably fitted within a suitable groove provided in a guide block 84, which is secured to the casing section 18 within the chamber 23. The lower portion of the guide block 84 has a slot 86 formed therein through which extends the end of the rocking lever 54 carrying the cam face 57, which is positioned in operative alignment with an inclined cam face 87 formed on the lower portion of the cam member 81.

Figure 4:
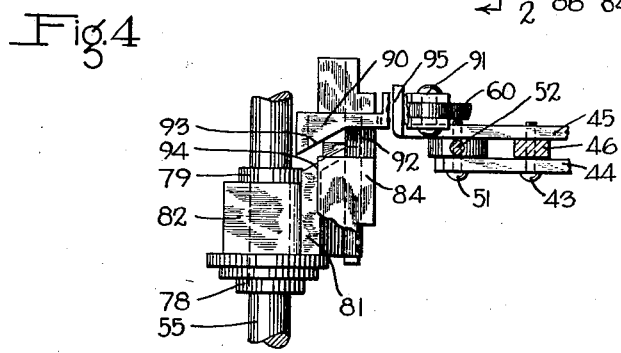
Fig. 4 is a fragmentary view taken on the line 4—4 of Fig. 2.

Interlocking mechanism is provided which is operative when the brake valve device is manually moved to a service position in the manner hereinafter described to prevent movement of the piston 79 and cam member 81 controlled thereby into the emergency position. The interlocking means comprises a bar or pawl 90, one end of which is pivotally connected by means of a pin 91 to the upper end of the vertically disposed lever 60, as is best shown in Fig. 2 of the drawings, the other end of said pawl being adapted to be moved through a slot 92 formed in the uppermost portion of the guide block 84 and into the path of the cam member 81. As is best shown in Fig. 4 of the drawings, the free end of the pawl 90 has formed thereon an inclined cam face 93, which is adapted for engagement with a corresponding cam face 94 formed on the uppermost portion of the cam member 81, when the pawl is moved into the service position as shown in Fig. 4. A spring 96 is provided for urging the pawl 90 downwardly into engagement with the lower face of the slot 92, one end of this spring being secured to the pawl and the other end attached to a suitable lug formed on the lever 60.

For rotating the shaft 55 there is provided an operating lever 97, which is keyed to said shaft exteriorly of the casing section 18 intermediate the ends of said lever. The operating lever 97 is normally urged into a release position under the tension of a spring 98 that is connected to the upper end of the lever and to the pipe bracket 17, and said lever is operative to turn the shaft 55 in a counterclockwise direction through the medium of a cable 100, which is secured to the lower end of the operating lever as shown in Fig. 1 of the drawings and is controlled by operation of the brake pedal device 15.

According to the invention, means is provided for rendering the interlocking mechanism ineffective to prevent movement of the cam member 81 and associated elements to the emergency position, even after a service application has been made, when the shaft 55 is rotated so as to cause movement of the plunger 46 to its uppermost position for operating the self-lapping valve mechanism to effect an emergency application of the brakes. In the embodiment of the invention now being described, this means comprises a lug 95, which is formed on a portion of the lever member 45 extending beyond the pin 51, as is best shown in Figs. 2 and 4 of the drawings. The lug 95 is operatively aligned with the pawl 90, and is adapted to engage and to lift said pawl out of the path of the cam member 81 when the associated levers 44 and 45 are moved beyond the service position thereof. It will thus be understood that the lug 95 on the lever 45 is adapted to permit the normal functioning of the pawl 90 so long as the self-lapping valve mechanism is not moved beyond service position, but that continued movement of the brake valve device beyond the service position by manual operation thereof in the manner hereinafter described will cause the lug 95 to raise the pawl 90 against the tension of the spring 96 so that said pawl cannot interfere with subsequent movement of the cam member 81 and the associated elements to the emergency position.

The brake pedal device 15 shown in Fig. 1 comprises a casing 105 which is adapted to be secured to the floor of the vehicle by any suitable means, not shown. Attached to the casing 105 is a lug 106 carrying a pin 107 to which is pivotally connected a bell crank lever 108, one arm of which is connected to the cable 100. The other arm of the bell crank lever 108 is pivotally connected to the lower end of a vertically arranged rod 110, the upper end of which extends through an aperture 109 in the casing 105 and is pivotally connected to a manually operable member 111. The member 111 has a portion 112 extending through an aperture 113 in the casing, and is journaled on a pin 115 carried on one end of a horizontally disposed arm 116, the other end of which is pivotally connected by means of a pin 117 to the casing 105. A foot pedal 119 is secured by any suitable means to the portion 112 for operating the member 111. A spring 120 is interposed between the casing 105 and the arm 116 and is adapted to urge said arm, the member 111 and the pedal 119 upwardly.

Contained in a valve chamber 122 formed in a casing section 121 secured to the casing 105 is a vent valve 123, which has a stem 124 extending through a bore in the casing into operative alignment with the arm 116. A spring 125 is interposed between the wall of the chamber 122 and a disk 126 engaging the valve 123, which spring is adapted to maintain the valve seated when the arm 116, the member 111, and the pedal 119 are held in their downward position as shown in the drawings under pressure applied to the pedal by the operator's foot. The upper surface of the disk 126 engages a supply valve 128, which has a fluted stem 129 mounted in a suitable bore in the casing and is adapted to control communication between the valve chamber 122 and a passage 130 formed in the casing and connected by way of a pipe 131 with the main reservoir 10.

The valve chamber 122 communicates by way of a passage 133 formed in the casing 105 with a chamber 134, which is connected through a bore 135 with a valve chamber 136 communicating with the pipe 68. Communication from the chamber 134 to the valve chamber 136 is controlled by a supply valve 138 having a fluted stem 139 mounted in the bore 135, the supply valve being normally held unseated by the pressure of a spring 140 which is interposed between the wall of the chamber 136 and a collar 141 formed on the valve. A vent valve 142 is mounted in the valve chamber 136 in operative engagement with the valve 138, and is adapted normally to be maintained seated by the pressure of the spring 140 acting through the medium of the valve 138. The vent valve 142 is provided with an upwardly projecting stem 143 that is in operative alignment with an end 144 of the member 111 and is adapted to be engaged thereby upon movement of said member into an emergency position.

In operation, fluid under pressure supplied in the usual manner to the main reservoir 10 flows through the pipe and passage 27 to the valve chamber 26 in the brake valve device 14, and also is supplied through the pipe 131, the passage 130 and past the fluted stem 129 to the valve chamber 122 in the cut-off valve device 15, it being assumed that the pedal 119 and the associated members 111 and 116 are held in the downward position by the operator's foot, as shown in Fig. 1. Fluid under pressure thus supplied to the valve chamber 122 flows from that chamber through the passage 133 and chamber 134 and past the normally open valve 138 to the valve chamber 136, and thence flows through the pipe 68 and the passage 67 in the brake valve device 14 to the chamber 66, shown in Fig. 3, so that the pressure of fluid acting against the emergency piston 70 moves said piston, the stem 71, the stem 74 and the cam member 81 controlled thereby toward the right-hand to the release position shown in the drawings.

While the pedal 119 of the brake pedal device 15 is held in release position as just described, the spring 98 on the brake valve device 14 is permitted to maintain the operating lever 97 in the release position as shown in Fig. 2 of the drawings, the self-lapping valve mechanism being at the same time so positioned that the supply valve 25 is maintained seated by the spring 28 while the discharge valve 35 is held away from the seat 36 by the spring 39. With the discharge valve 35 unseated, the brake cylinder 11 communicates with the atmosphere by way of the pipe and passage 24, the pressure chamber 23, the passage 38 in the piston 30 and through the connected chambers 37 and 32 and passage and pipe 33.

If the operator's foot is removed from the pedal 119, the spring 120 is permitted to move the arm 116 and the member 111 upwardly into the dead man's emergency position, the arm turning about the pivot pin 117. In so moving, the arm 116 engages the stem 124 and thereby shifts the associated valves 123 and 128 upwardly, overcoming the pressure of spring 125, until the valve 128 is seated and the valve 123 unseated for establishing communication from the chamber 122 to the atmosphere.

With the valve 123 unseated, fluid under pressure is vented to the atmosphere from the emergency chamber 66 in the brake valve device 14 by way of the passage 67, the pipe 68, chamber 136, past the unseated valve 138 and through the chamber 134, and through the passage 133 and valve chamber 122 and past the unseated valve 123. As the pressure of fluid in the chamber 66 is thus reduced, the springs 77 act through the medium of the collar 78 and the stem 74 to shift the cam member 81 to the left, as viewed in Fig. 3 of the drawings. The inclined cam face 87 of the cam member 81 is thereby brought into engagement with the cam face 57 on the rocking lever 54, and continued movement of the cam member then causes said rocking lever to turn in a counterclockwise direction about the shaft 54, as viewed in Fig. 2 of the drawings.

As the rocking lever 54 is thus rotated in a counterclockwise direction, the arm 56 thereof moves the plunger 46 and the associated levers 44 and 45 upwardly. In so moving, the levers 44 and 45 initially act through the medium of the roller 49 and the stem 41 to move the release valve 35 into engagement with the seat 36, overcoming the pressure of the spring 39, it being understood that said spring is somewhat weaker than the spring 28 which urges the supply valve 25 to its seat. With the release valve 35 seated, communication from the chamber 32 and consequently from the brake cylinder to the atmosphere is cut off. The metering spring 31 exerts a greater force than that of the spring 39 and the spring 28 combined, so that continued upward movement of the plunger 46 by rotation of the rocking lever 54 in the manner described causes the levers 44 and 45 to turn about the pin 48 as a fulcrum, thereby moving the stem 52 upwardly so as to unseat the supply valve 25 against the pressure of the spring 28.

With the supply valve 25 unseated, fluid under pressure is supplied from the main reservoir 10 by way of the pipe and passage 27 and the valve chamber 26 to the pressure chamber 23 and thence through the passage and pipe 24 to the brake cylinder 11. When the pressure of fluid in the chamber 23 slightly exceeds the pressure of spring 31, the fluid pressure forces the piston 30 upwardly until a stem 148 provided on said piston engages a stop member 149 mounted in the brake valve device 14, it being understood that the plunger 46 is at the same time moved to its uppermost or emergency position. The supply valve 25 is thus maintained open so that the brake cylinder 11 is supplied with fluid at the maximum pressure carried in the main reservoir, thereby effecting an emergency application of the brakes.

Meanwhile, as the springs 77 and 77a move the stem 74 and the elements associated therewith to the left as shown in Fig. 3, the piston 73 is shifted in the bore 72 to a position in which communication is established between the chamber 23 and a passage 151 formed in the casing of the brake valve device, which passage is connected by way of a pipe 152 with the sanding device 12 and through a pipe 153 with the circuit breaker device 13. The circuit breaker device 13 is then operated in the usual manner to cut off the supply of current to the driving motors of the vehicle, while the sanding device 12, which may be of any desired type, is operated to supply sand to the rails.

In order to effect a release of the brakes following a dead man's emergency application, the pedal 119 of the brake pedal device 15 is depressed to the position shown in Fig. 1 so that the valve 123 is seated, while the valve 128 is unseated to permit the supply of fluid under pressure from the main reservoir to the chamber 66 in the brake valve device 14. As fluid at main reservoir pressure is supplied to the chamber 66 as just described, the piston 70 and the cam member 81 operated thereby are forced toward the right-hand as viewed in Fig. 3, thereby freeing the rocking lever 54, which is then turned in a clockwise direction by the plunger 46 as said plunger and the associated elements of the self-lapping valve mechanism are returned to the release position as shown in Fig. 2 of the drawings.

If it is desired to effect a service application of the brakes, the brake pedal device 15 is operated through the medium of the pedal 119 so that the member 111 and the rod 110 pivotally connected thereto are moved downwardly, the member 111 turning about the journal 115. In moving downwardly the rod 110 causes the bell crank lever 108 to turn in a counterclockwise direction about the pin 107, thus operating the cable 100 to turn the operating lever 97 on the brake valve device 14 toward service position. As the shaft 55, shown in Fig. 2, is thus rotated in a counterclockwise direction through the medium of the lever 97, the lug 63 carried on the lever 60 keyed on said shaft moves the rocking lever 54 so that the arm 56 thereof forces the plunger 46 upwardly. As the plunger 46 is moved upwardly, the levers 44 and 45 pivotally carried thereon are first fulcrumed on the pin 51 which is held stationary by the spring 28, the levers thereby moving stem 41 until the release valve 35 is moved to its seat, whereupon said levers are turned about the pin 48 as a fulcrum for unseating the supply valve 25. With the supply valve 25 unseated, fluid under pressure is supplied from the main reservoir 10 through the pipe and passage 27 and valve chamber 26 to the pressure chamber 23, and thence flows through the passage and pipe 24 to the brake cylinder 11. Upon the increase in the pressure of fluid in the pressure chamber 23 to a value slightly exceeding the opposing force of the spring 31, the piston 30 is moved upwardly, permitting the spring 26 to move the supply valve 25 to its seat, the rod 52 being moved downwardly to rock the levers 44 and 45 in a counterclockwise direction about the pin 43. Thus the brake valve device is automatically operated to lap the supply valve while maintaining the exhaust valve seated.

It will be noted that during the operation of the brake valve device 14 just described, when the shaft 55 is rotated in a counterclockwise direction the vertically disposed lever 60 secured thereto is operated to move the pawl 90 toward the left, as viewed in Fig. 2, the cam face 93 of the pawl being thereby positioned in the path of the cam member 81, as is illustrated in Fig. 4.

With the apparatus in service position, the operator may remove his foot from the pedal 119 of the pedal valve device 15 without causing a dead man's emergency application of the brakes. If the operator's foot is removed from the pedal 119, the resulting venting of fluid under pressure from the chamber 66 in the brake valve device in the manner hereinbefore described will permit the springs 77 and 77a to shift the stem 74 and the cam member 81 to the left only until said cam member engages the pawl 90, this movement being insufficient to effect the emergency operation of the brake valve device 14.

According to the invention, however, if it is desired to effect an emergency application of the brakes following operation to effect a service application as just described, the operator may move the pedal 119 on the brake pedal device 15 downwardly beyond the service position thereof into an emergency position, wherein the end 144 of the member 111 is brought into operating engagement with the stem 143 so as to unseat the valve 142 and to seat the valve 138 against the pressure of the spring 140.

At the same time, the member 111 moves the rod 110 downwardly and operates the bell crank lever 108, the cable 100, and the operating lever 97 on the brake valve device 14 to rotate the shaft 55 thereof in a counterclockwise direction. This movement of the operating arm 97 rotates the shaft 55 beyond the maximum service position thereof, and the rocking lever 54 is consequently operated by said shaft to force the plunger 46 to its uppermost position. As the plunger 46 and the levers 44 and 45 connected thereto are thus moved upwardly beyond their service positions, the lug 95 carried on the arm 45 is brought into engagement with the lower surface of the pawl 90, which is thereupon forced upwardly against the force of spring 96, turning about the pin 91, until the cam face 93 of the pawl is moved out of the path of the cam member 81.

Meanwhile, with the valve 142 unseated, fluid under pressure is vented from the chamber 66 in the brake valve device 14 by way of the passage 67, the pipe 68, the valve chamber 136 in the brake pedal device 15 and past the fluted stem 143 to the atmosphere. Upon the reduction in the pressure of fluid in the chamber 66, the brake valve device 14 is operative in the manner hereinbefore described to effect an emergency application of the brakes.

It will now be apparent that the form of the invention just described comprises means adapted to be mechanically actuated upon movement of the brake valve device beyond the service position thereof to hold the interlocking bar or pawl 90 in a position wherein the pawl is ineffective to prevent automatic operation of the brake valve device to emergency position.

Fluid pressure brake apparatus embodying another form of the invention is illustrated in Figs. 5, 6, and 7 of the drawings. The brake valve device shown in Fig. 5 is substantially the same in construction and arrangement of its parts as that shown in Fig. 2 of the drawings and includes the casing sections 17, 18, 20, and 21a. The casing section 21a is adapted to contain emergency piston mechanism similar to that carried within the casing section 21 of Fig. 2, and in addition is provided with a cylinder portion 156. A piston 157 is slidably mounted in a suitable bore formed in the cylinder portion 156 and forms on one side a chamber 158 which is connected to a pipe 159. A gasket 160 is inserted in the lower face of the piston 157 and a spring 162 is provided for urging the piston downwardly so that the gasket engages an annular seat member 163 mounted in the cylinder portion, said spring being interposed between the piston 157 and a cap 164 which is secured to the cylinder portion in any suitable manner for closing the chamber 158. The piston 157 is provided with a stem 165, which has screw-threaded connection with said piston and may be secured in position by means of a locking nut 166. The lower end of the stem 165 extends into the chamber 23 and has formed thereon an arm 167 that extends around the guide block 84 and carries a lug 168 which is normally positioned beneath and in operative alignment with the pawl 90.

As shown in Fig. 7 of the drawings, a pedal valve device adapted for controlling operation of the brake valve device shown in Fig. 5 is provided. The pedal valve device comprises a casing 170 having a substantially horizontally disposed lever 171 mounted thereon by means of a pin 172, the other end of which lever carries a pin 173 on which is journaled a lever 174 adapted to be operated through the medium of a pedal 175. A rod 177 is pivotally connected to the lever 174 by means of a pin 178, and extends downwardly through an aperture 179 formed in the casing 170, the lower end of the rod being operatively connected to the operating lever 97 on the brake valve shown in Fig. 5 by suitable means, such as the bellcrank lever 108 and the cable 100 as shown in Fig. 1 of the drawings. A spring 181 is interposed between the casing 170 and the lever 171 for urging the lever and the associated elements upwardly into a dead man's emergency position, it being understood that in the drawings the brake pedal device is shown in release position.

Contained in a valve chamber 182 formed in a casing section 185 secured to the casing 170 is a vent valve 183 which has a fluted stem 184 extending downwardly in operative alignment with the lever 171, and which is normally urged into seated position by a spring 186 that is interposed between the wall of the chamber 182 and a disk 187 engaging said valve. A normally unseated supply valve 188 is provided in the chamber 182 in engagement with the upper face of the disk 187, the supply valve being adapted to be moved to its seat when the vent valve 183 is unseated. The supply valve 188 is adapted to control communication from the valve chamber 182 to a passage 190 connected with the main reservoir by way of pipe 131.

A supply valve 191 is disposed in a valve chamber 192 formed in the casing 170 for controlling communication between that chamber and a chamber 193 which is connected by way of a pasage 194 formed in the casing with the valve chamber 182. Engaging the valve 191 in the chamber 192 is a vent valve 195, which is provided with a fluted stem 196 extending upwardly through a suitable bore formed in the casing 170. A spring 197 is interposed between the lower wall of the chamber 192 and a collar 199 formed on the valve 191 and is adapted to urge the valves 191 and 195 into unseated and seated positions, respectively. The chamber 192 communicates by way of a passage 200 in the casing 170 with the pipe 68 which leads to the emergency piston chamber in the brake valve device shown in Fig. 5, it being understood that this chamber is the same as that designated at 66 in Fig. 3.

A supply valve 202 and a vent valve 203 in engagement therewith are provided in a valve chamber 204 which is formed in the casing 170 and communicates through the pipe 159 with the chamber 158 in the brake valve device shown in Fig. 5 of the drawings. A spring 204 is interposed between the casing and a collar 208 provided on the valve 202 for urging said valve into unseated position, the vent valve 203 being normally maintained seated as shown in Fig. 7. The vent valve 203 is provided with a fluted stem 210 which extends upwardly through a suitable bore in the casing 170 and is operatively connected to one end of a yoke 211 by any suitable means, such as the pin 213, the opposite end of the yoke being similarly connected to the upper end of the stem 196, as by the pin 214. The yoke 211 is adapted to be operatively engaged by the end 215 of the lever 174 upon downward movement thereof for operating both sets of valves at the same time.

With the brake pedal device and the brake valve device in their release positions as shown in Figs. 5 and 7 of the drawings, fluid under pressure is supplied from the main reservoir through the pipe 131, a branch pipe 131a, a passage 217 in the casing 170, past the unseated supply valve 202, and through the chamber 204 and pipe 159 to the chamber 158 in the brake valve device for holding the piston 157 in the position shown in the drawings.

The operation of the apparatus shown in Figs. 5 and 7 of the drawings in the dead man's emergency and service positions thereof will be readily understood from the description hereinbefore presented in connection with the apparatus shown in Fig. 1. Assuming that the pedal 175 is operated so as to move the brake valve device shown in Fig. 5 into a service position so as to effect the supply of fluid under pressure to the chamber 23 and the brake cylinder for causing a service application of the brakes, the pawl 90 is moved in the usual manner toward the left-hand and into the path of the cam member 81, which is of course held in its release position by the pressure of fluid acting on the emergency piston as hereinbefore described. While the brake pedal device is in service position, communication is maintained from the main reservoir by way of the pipe 131, branch pipe 131a, passage 217, past the unseated supply valve 202, and through the chamber 204 and the pipe 159 to the piston chamber 158 in the brake valve device, so that the piston 157 is held in the position shown in the drawings against the opposing pressure fluid at brake cylinder pressure in the chamber 23.

If it is desired to effect an emergency application of the brake following operation of the apparatus into the service position as just described, the pedal 175 on the brake pedal device is moved downwardly beyond the service position, so that the end 215 of the lever 174 is brought into operative engagement with the yoke 211 for operating the two pairs of valves associated therewith. The valves 191 and 202 are thereby moved into engagement with their respective seats against the pressures of the springs 197 and 207, respectively, while the vent valves 195 and 203 are unseated.

With the vent valve 203 unseated, fluid under pressure is vented from the chamber 158 in the cylinder portion 156 in the brake valve device shown in Fig. 5 by flow through the pipe 159, the valve chamber 204, and past the unseated valve 203 and the fluted stem 210 to the atmosphere. Upon the reduction in fluid pressure in the chamber 158, the pressure of fluid in the chamber 23 acting on the portion of the piston 157 exposed to said chamber within the seat 163 is enabled to force the piston upwardly, thereby exposing the full pressure area thereof to the chamber 23. The piston 157 is thereupon moved to its uppermost position with a quick snap-like action, and through the medium of the stem 165 and the arm 167 causes the lug 168 thereon to lift the pawl 90 upwardly against the force of the spring 96. The pawl 90 is thus moved out of the path of the cam member 81.

At the same time, fluid under pressure is vented from the emergency piston chamber by way of the pipe 68 and through the passage 200 in the pedal valve device shown in Fig. 7, the valve chamber 192 and past the open vent valve 195 to the atmosphere, so as to permit the usual operation of the cam member 81 and the elements associated therewith to the emergency position in the manner already described.

It will thus be apparent that according to the embodiment of the invention just described, means operable by fluid pressure is provided for moving the pawl 90 into a position wherein the pawl is not effective to prevent operation of the brake valve device for causing an emergency application of the brakes, the fluid pressure operated means being operated only when the brake control pedal is moved beyond a service position by the operator.

While two illustrative embodiments of the invention have been described in detail, it is not my intention to limit its scope to those em embodiments or otherwise than by the terms of the appended claims.

Having now described my invention, what I claim as new and desire to secure by Letters Patent, is:

1. In a fluid pressure brake, in combination, valve means operative upon movement to a service position to effect a service application of the brakes and upon a further movement to an emergency position to effect an emergency application of the brakes, automatic means operative upon a reduction in fluid pressure for moving said valve means to the emergency position, manually controlled means for operating said valve means, locking mechanism operative upon movement of said valve means to service position by the manually controlled means for preventing operation of said automatic means, and means operative when said manually controlled means is operated for moving said valve means beyond the service position to render said locking mechanism ineffective to prevent the operation of the automatic means.

2. In a fluid pressure brake, in combination, brake valve means controlling the application of the brakes and having release, service and emergency positions, automatic means operative for moving said brake valve means to emergency position, manually operable means for operating said brake valve means and movable to a service position for causing said valve means to effect a service application of the brakes, said manually operable means being operable upon release by the operator for effecting operation of the automatic means to emergency position, a member associated with said manually operable means adapted to be moved to a locking position for preventing operation of the automatic means when said brake valve means is moved to service position, and means operative upon movement of said manually operable means to a position beyond service position to hold said member out of its locking position.

3. In a fluid pressure brake, in combination, valve means operative upon movement to a service position to effect a service application of the brakes and upon a further movement to an emergency position to effect an emergency application of the brakes, manually controlled means for operating said valve means, automatic means operative upon a reduction in fluid pressure for moving said valve means to the emergency position, locking mechanism including a pawl operative by said manually controlled means in moving said valve means to service position to prevent operation of said automatic means, and a member associated with the valve means and actuated upon movement of said valve means beyond the service position by said manually controlled means to render said pawl ineffective to prevent operation of the automatic means.

4. In a fluid pressure brake, in combination, a self-lapping brake valve device comprising a supply valve, a discharge valve, a pivotally mounted lever for moving said valves to positions for effecting service and emergency applications of the brakes, manually operable means for actuating said lever, automatic emergency mechanism operative to move said lever to a position for operating said valves to effect an emergency application of the brakes, a member associated with said manually operable means and biased to a locking position for preventing operation of said emergency mechanism while said brake valve device is in a service application position, and a lug carrier by said lever and operatively aligned with said member, said lug being operative upon movement of the lever from service toward the emergency position by said manually operable means to hold said member out of the locking position.

5. In a fluid pressure brake, in combination, valve means operative in a service position to effect a service application of the brakes and on a further movement to an emergency position to effect an emergency application of the brakes, manually controlled means for operating said valve means, automatic means operative upon a reduction in fluid pressure for moving said valve means to the emergency position, locking mechanism including a pawl operative by said manually controlled means in moving said valve means to service position to prevent operation of said automatic means, a member operative to render said pawl ineffective to prevent operation of the automatic means, and fluid pressure controlled means adapted to operate said member when said manually controlled means is operated to move the valve means beyond the service position.

6. The combination with a brake valve device comprising self-lapping valve means movable to different positions for supplying and releasing fluid under pressure to and from a chamber in effecting the application and release of the brakes, manually operable means for operating said valve means, automatic emergency means for operating said valve means to effect an emergency application of the brakes, and locking means actuated by the manually operable means in moving the valve means to a service position for preventing operation of said automatic emergency means, of mechanism adapted to render the locking means ineffective when the manually operable means is operated to move the brake valve device from the service position toward the emergency position, said mechanism including a movable abutment operative by the pressure of fluid in said chamber upon a reduction in an opposing pressure.

7. The combination with a brake valve device comprising self-lapping means movable to different positions for supplying and releasing fluid under pressure to and from a chamber in effecting the application and release of the brakes, manually operable means for operating said valve means, automatic emergency means for operating said valve means to effect an emergency application of the brakes, and locking means actuated by the manually operable means in moving the valve means to a service position for preventing operation of said automatic emergency means, of movable abutment means adapted to be operated by the pressure of fluid in said chamber upon a reduction in the fluid pressure in another chamber for rendering said locking means ineffective, and valve means adapted to be actuated by said manually operable means in moving the brake valve device from the service position toward the emergency position thereof to vent fluid under pressure from said other chamber.

8. In a fluid pressure brake, in combination, brake valve means operative in a service position to effect a service application of the brakes and on a further movement to an emergency position to effect an emergency application of the brakes, automatic emergency means operative upon a reduction in the pressure of fluid in a chamber for moving said brake valve means to the emergency position, a vent valve operative to vent fluid under pressure from said chamber, and means manually operable through a service zone for operating said brake valve means to effect a service application of the brakes, said means being operative on further movement thereof beyond the serice zone to actuate said vent valve for venting fluid under pressure from said chamber.

9. In a fluid pressure brake, in combination, brake valve means operative in a service position to effect a service application of the brakes and on a further movement to an emergency position to effect an emergency application of the brakes, automatic emergency means operative upon a reduction in the pressure of fluid in a chamber for moving said brake valve means to the emergency position, a pair of vent valves adapted to be independently actuated to vent fluid under pressure from said chamber, and manually operable means movable through a service zone for operating said brake valve means to effect a service application of the brakes, said manually operable means being operative when released by the operator for actuating one of said vent valves and when moved to a position beyond the service zone to actuate the other vent valve.

10. In a fluid pressure brake, in combination, brake valve means operative in a service position to effect a service application of the brakes and on a further movement to an emergency position to effect an emergency application of the brakes, automatic emergency means operative upon a reduction in the pressure of fluid in a chamber for moving said brake valve means to the emergency position, manually operable means for operating said brake valve means, locking means actuated by the manually operable means in moving said brake valve means to a service position for preventing operation of said emergency means, means operative upon a reduction in the pressure of fluid in another chamber to render said locking means ineffective to prevent operation of said emergency means, and valve means adapted to be actuated by said manually operable means in moving the brake valve means from service position toward emergency position to vent fluid under pressure from both of said chambers.

ELLIS E. HEWITT.

CERTIFICATE OF CORRECTION.

Patent No. 2,096,494.　　　　　　　　　　　　　　October 19, 1937.

ELLIS E. HEWITT.

It is hereby certified that error appears in the printed specification of the above numbered patent requiring correction as follows: Page 6, second column, line 45, claim 4, for the word "carrier" read carried; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.